US012570545B2

(12) United States Patent
Bergner et al.

(10) Patent No.: US 12,570,545 B2
(45) Date of Patent: Mar. 10, 2026

(54) PROCESS FOR MAKING A PARTICULATE (OXY)HYDROXIDE, AND PARTICULATE (OXY)HYDROXIDE AND ITS USE

(71) Applicant: BASF SE, Ludwigshafen Am Rhein (DE)

(72) Inventors: Benjamin Johannes Herbert Bergner, Ludwigshafen (DE); Rafael Benjamin Berk, Ludwigshafen (DE); Lennart Karl Bernhard Garve, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 497 days.

(21) Appl. No.: 18/248,629

(22) PCT Filed: Sep. 16, 2021

(86) PCT No.: PCT/EP2021/075441
§ 371 (c)(1),
(2) Date: Apr. 11, 2023

(87) PCT Pub. No.: WO2022/078702
PCT Pub. Date: Apr. 21, 2022

(65) Prior Publication Data

US 2023/0406722 A1 Dec. 21, 2023

(30) Foreign Application Priority Data

Oct. 13, 2020 (EP) .................................... 20201539

(51) Int. Cl.
*C01G 53/82* (2025.01)
*H01M 4/02* (2006.01)
(Continued)

(52) U.S. Cl.
CPC ............ *C01G 53/82* (2025.01); *H01M 4/505* (2013.01); *H01M 4/525* (2013.01); *H01M 4/623* (2013.01);
(Continued)

(58) Field of Classification Search
CPC ...... C01G 53/82; H01M 4/505; H01M 4/525; H01M 4/623; H01M 4/625
See application file for complete search history.

(56) References Cited

U.S. PATENT DOCUMENTS 5,861,131 A 1/1999 Wakao
2010/0310869 A1 12/2010 Jahn et al.
(Continued)

FOREIGN PATENT DOCUMENTS

CN 104157872 A 11/2014
CN 104157873 A 11/2014
(Continued)

OTHER PUBLICATIONS

International Search Report and Written Opinion for corresponding PCT/EP2021/075441 mailed Oct. 12, 2021; 9 pages.

*Primary Examiner* — Sarah A. Slifka
(74) *Attorney, Agent, or Firm* — Armstrong Teasdale LLP

(57) ABSTRACT

Described herein is a process for making a particulate (oxy)hydroxide of TM, where TM are metals and TM includes at least 60 mol-% nickel, and where said process includes the steps of:

Figure 1:
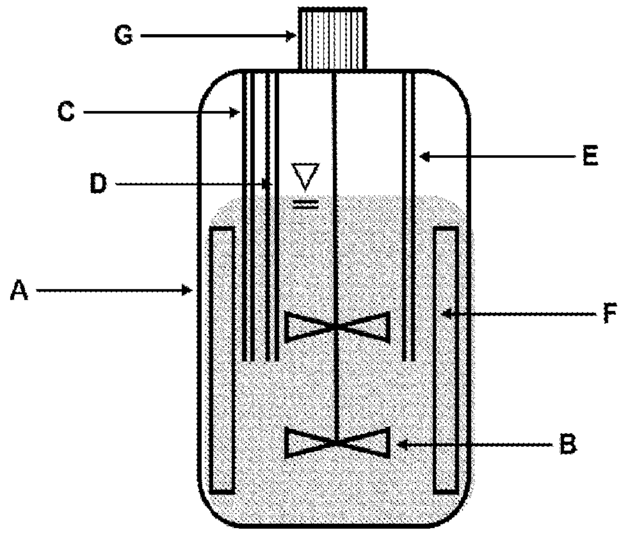
Figure 1:
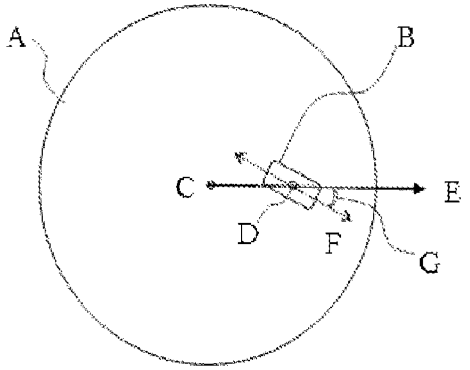

(a) providing an aqueous solution (α) including water-soluble salts of Ni and of at least one metal selected from the group consisting of Co and Mn, and, optionally, at least one further metal selected from the group consisting of Ti, Zr, Mo, W, Al, Mg, Nb, and Ta, and an aqueous solution (β) an alkali metal hydroxide and, optionally, an aqueous solution (γ) including ammonia, (Continued)

(b) combining the solution (α) and the solution (β) and, if applicable, the solution (γ) at a pH value in a range of from 11.0 to 13.0 in a stirred tank reactor, thereby creating solid particles of a hydroxide containing nickel, said solid particles being slurried.

16 Claims, 3 Drawing Sheets

(51) Int. Cl.

| | |
|---|---|
| ***H01M 4/505*** | (2010.01) |
| ***H01M 4/525*** | (2010.01) |
| ***H01M 4/62*** | (2006.01) |

(52) U.S. Cl.

CPC ......... *H01M 4/625* (2013.01); *C01P 2004/03* (2013.01); *C01P 2004/50* (2013.01); *C01P 2004/53* (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2017/0352884 | A1 | 12/2017 | Saruwatari et al. |
| 2021/0005877 | A1 | 1/2021 | Kim et al. |
| 2022/0006084 | A1 | 1/2022 | Lee et al. |
| 2022/0399544 | A1 | 12/2022 | Nakamura et al. |
| 2023/0081939 | A1 | 3/2023 | Jeong et al. |
| 2023/0253559 | A1 | 8/2023 | Kaneda et al. |

FOREIGN PATENT DOCUMENTS

| | | | |
|---|---|---|---|
| CN | 112777647 | A | 5/2021 |
| EP | 1189296 | A2 | 3/2002 |
| EP | 3023391 | A1 | 5/2016 |
| JP | 2013180917 | A | 9/2013 |
| JP | 2014510004 | A | 4/2014 |
| JP | 201620283 | A | 2/2016 |
| JP | 2017178701 | A | 10/2017 |
| WO | 2012095381 | A2 | 7/2012 |
| WO | 2013117508 | A1 | 8/2013 |
| WO | 2020094482 | A1 | 5/2020 |

Figure 2: illustration of the determination of radially oriented primary particles Figure 3: Top view SEM images of C-TM-OH.1 (left). TM-OH-2 (middle) and TM-OH.3 (right).
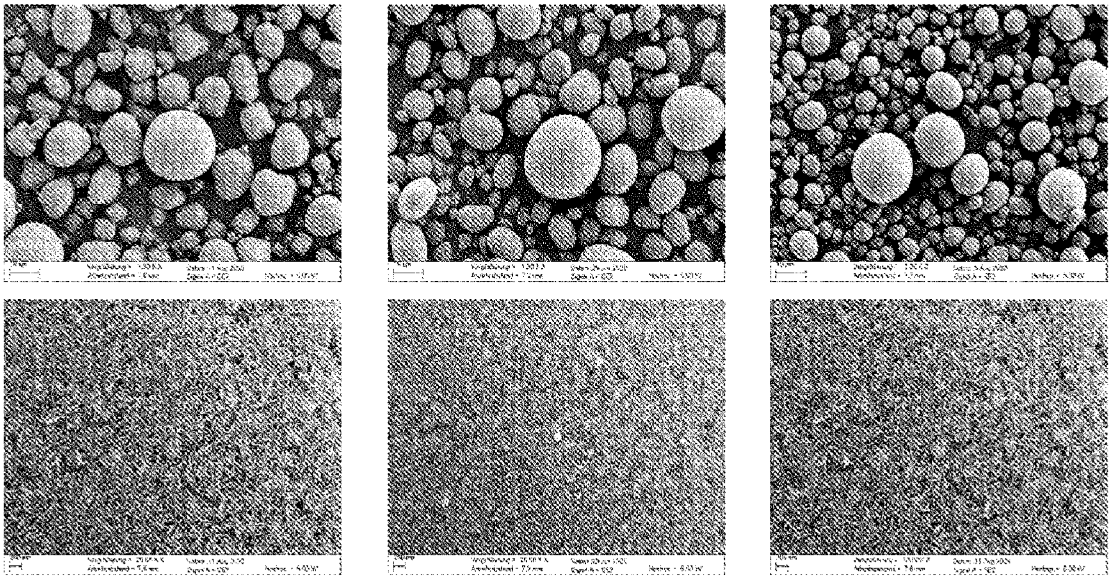
Figure 4: Cross sectional SEM images of C-TM-OH.1 (left) and TM-OH.3 (right).
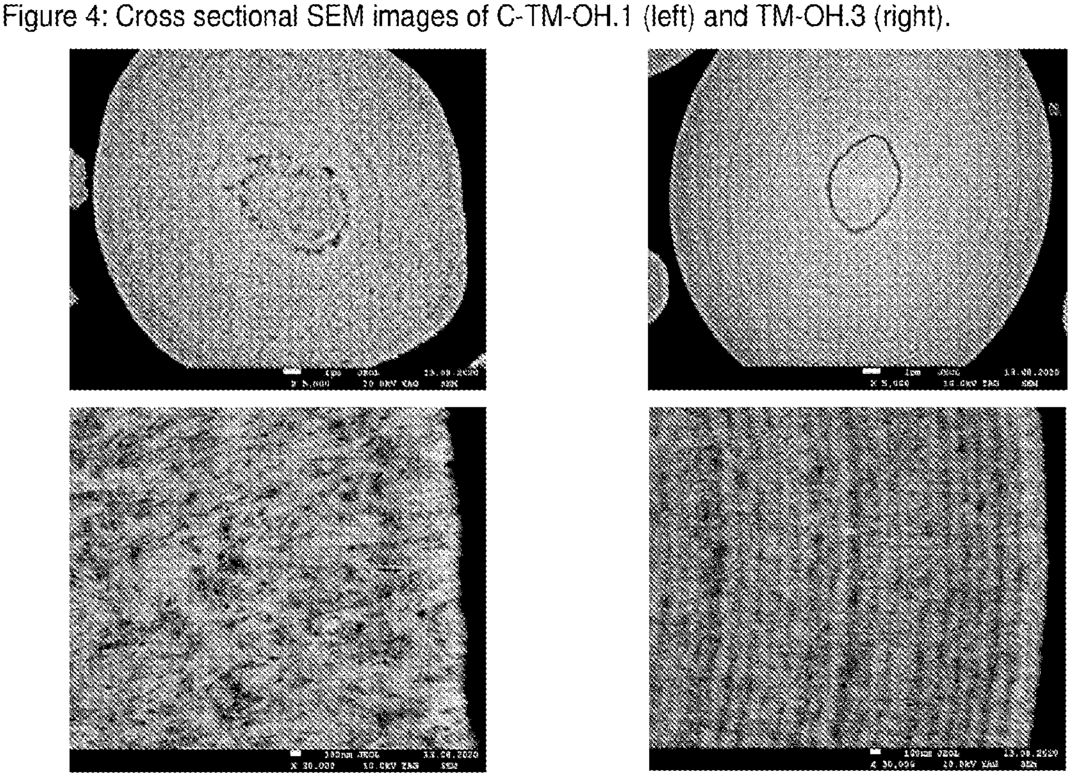

Figure 5: Top view SEM and cross-sectional SEM images of C-TM-OH.6 (left) and TM-OH.7 (right).
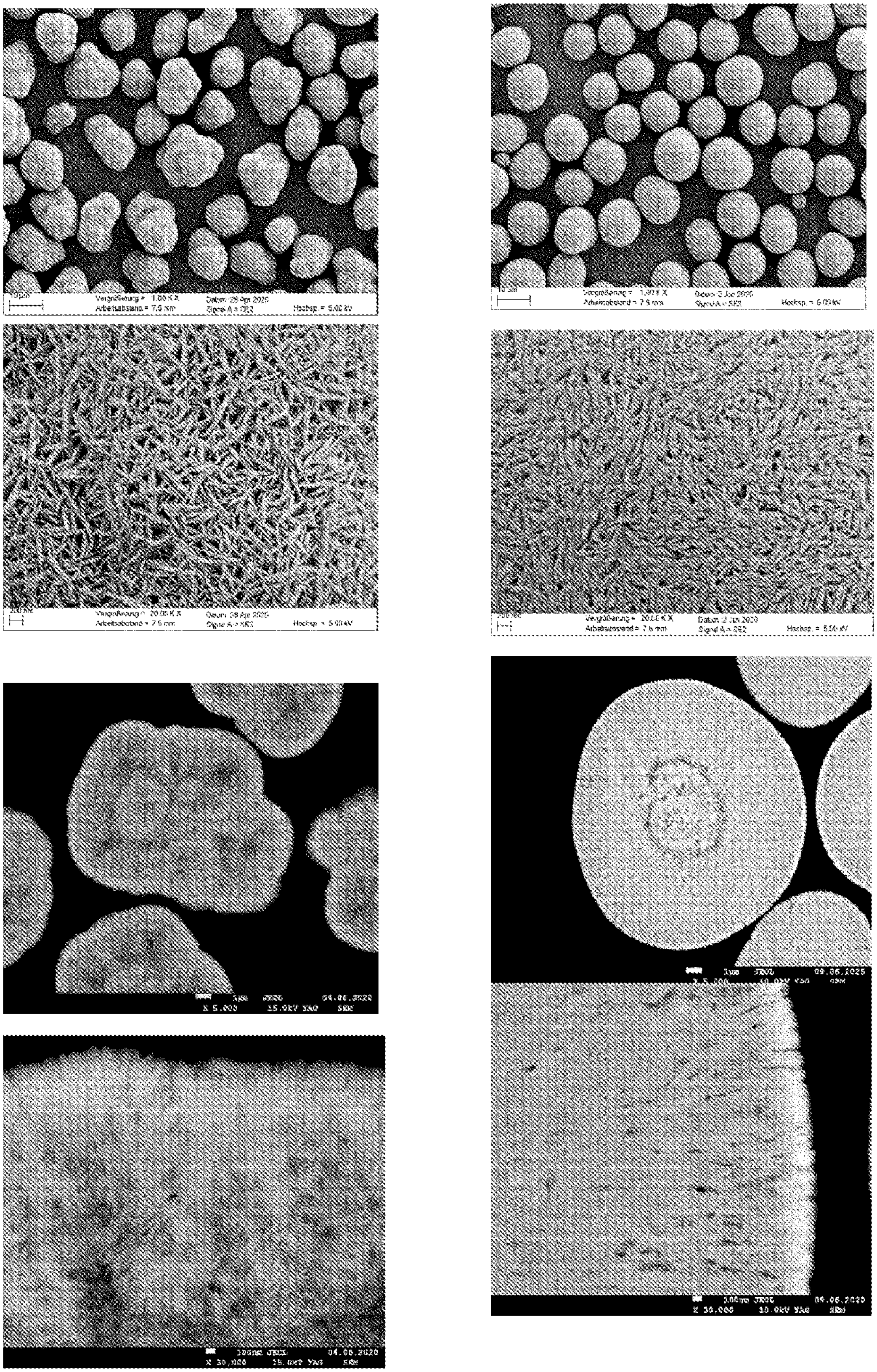

PROCESS FOR MAKING A PARTICULATE (OXY)HYDROXIDE, AND PARTICULATE (OXY)HYDROXIDE AND ITS USE

CROSS-REFERENCE TO RELATED APPLICATIONS

This application is a U.S. National Phase Application of PCT/EP2021/075441, filed Sep. 16, 2021, which claims the benefit of priority to European Patent Application No. 20201539.2, filed Oct. 13, 2020, the entire contents of which are hereby incorporated by reference herein.

The present invention is directed towards a process for making a particulate (oxy)hydroxide of TM wherein TM are metals and TM comprises at least 60 mol-% nickel and wherein said process comprises the steps of:

(a) Providing an aqueous solution (α) containing water-soluble salts of Ni and of at least one metal selected from Co and Mn, and, optionally, at least one further metal selected from Ti, Zr, Mo, W, Al, Mg, Nb, and Ta, and in the range of from 0.01 to 0.05 mol-%, referring to TM, of α- or β-amino acid or its alkali metal salt, and an aqueous solution (β) containing an alkali metal hydroxide and, optionally, an aqueous solution (γ) containing ammonia, (b) combining a solution (α) and a solution (β) and, if applicable, a solution (γ) at a pH value in the range of from 10.0 to 13.0 in a stirred tank reactor, thereby creating solid particles of a hydroxide containing nickel, said solid particles being slurried.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Corresponding mixed oxides are prepared generally using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100° C.

Existing lithium ion batteries still have potential for improvement, especially with regard to the energy density. For this purpose, the cathode active material should have a high specific capacity. This can be achieved, e.g., by an excellent regular shape of the cathode active material particles. Usually, the morphology of the precursor translates into the morphology of the cathode active material unless altered significantly during calcination.

In WO 2012/095381 and WO 2013/117508, processes for the precipitation of hydroxides or carbonates are disclosed wherein vessels with compartments are used. A lot of energy is introduced in the respective compartment(s). Carrying out said process on commercial scale is difficult, though.

It has been observed that in the course of upscaling, the process of making precursors is very sensitive against changes of pH value. Small pH value changes can have a significant impact on precursor properties, for example the particle diameter.

It was an objective of the present invention to provide a process for making precursors of cathode active materials for lithium ion batteries which have a high volumetric energy density and excellent cycling stability. More particularly, it was therefore an objective of the present invention to provide starting materials for batteries which are suitable for producing lithium ion batteries with a high volumetric energy density and excellent cycling stability. It was a further objective of the present invention to provide a process by which suitable starting materials for lithium ion batteries can be prepared. In addition, it was an objective to provide a process for making precursors that is not sensitive against pH value changes.

Without wishing to be bound to any theory, it can be assumed that the lithiation process is depending on the particle diameter, porosity and specific surface area of a precursor. It was an objective of the present invention to provide a process for making precursors which can be lithiated in a very efficient way. More particularly, it was therefore an objective of the present invention to provide starting materials for batteries which can be lithiated in a very efficient way.

Accordingly, the process defined at the outset has been found, hereinafter also referred to as inventive process or process according to the (present) invention. The inventive process may be carried out as a batch process or as a continuous or semi-continuous process. Preferred are continuous processes.

The inventive process comprises at least two steps, hereinafter also referred to as step (a) and step (b), and it may comprise sub-steps. The inventive process will be described in more detail below.

The inventive process is a process for the manufacture of a particulate (oxy)hydroxide of TM wherein TM are metals and TM comprises at least 60 mol-% nickel and wherein said process comprises the steps of (a) Providing an aqueous solution (α) containing water-soluble salts of Ni and of at least one metal selected from Co and Mn, and, optionally, at least one further metal selected from Ti, Zr, Mo, W, Al, Mg, Nb, and Ta, and in the range of from 0.01 to 0.05 mol-%, referring to TM, of α- or β-amino acid or its alkali metal salt, and an aqueous solution (β) containing an alkali metal hydroxide and, optionally, an aqueous solution (γ) containing ammonia, (b) combining a solution (α) and a solution (β) and, if applicable, a solution (γ) at a pH value in the range of from 10.0 to 13.0 in a stirred tank reactor, thereby creating solid particles of a hydroxide containing nickel, said solid particles being slurried.

In one embodiment of the present invention, with an average particle diameter (D50) in the range of from 2 to 20 μm, preferably 3 to 16 μm, more preferably 5 to 12 μm, determined by LASER diffraction.

In one embodiment of the present invention, inventive precursors have a particle size distribution [(D90)−(D10)] divided by (D50) is in the range of from 0.35 to 2, preferably from 0.35 to 0.5 or from 0.8 to 1.4.

In one embodiment of the present invention, TM is a combination of metals according to general formula (I)

$$(Ni_aCo_bMn_c)_{1-d}M_d \quad (I)$$

with a being in the range of from 0.7 to 0.99, preferably from 0.83 to 0.92, b being zero or in the range of from 0.01 to 0.2, preferably from 0.03 to 0.15, c being in the range of from zero to 0.2, preferably from 0.03 to 0.15, d being in the range of from zero to 0.1, preferably from 0.003 to 0.03, M is at least one of Al, Mg, Ti, Mo, Nb, Ta, W and Zr, and b+c>zero, and a+b+c=1.

The inventive process is a process for manufacture of a particulate (oxy)hydroxide of TM. In the context of the present invention, "(oxy)hydroxides" refer to hydroxides and do not only include stoichiometrically pure hydroxides but especially also compounds which, as well as transition metal cations and hydroxide ions, also have anions other than hydroxide ions, for example oxide ions and carbonate ions, or anions stemming from the transition metal starting material, for example acetate or nitrate and especially sulfate. Oxide ions may stem from a partial oxidation, for example oxygen uptake during drying. Carbonate may stem from the use of technical grade alkali metal hydroxide.

In addition, sulfate may also be present as an impurity in embodiments in which a sulfate was used as starting material, for example in a percentage of 0.001 to 1 mole-%, preferably 0.01 to 0.5 mole-%. Such sulfate will be neglected in the context of the present invention.

In one embodiment of the present invention, the precipitated (oxy)hydroxide of TM has the formula $TMO_x(OH)_y(CO_3)_t$ with $0 \le x < 1$, $1 < y \le 2.2$, and $0 \le t \le 0.3$, preferably $0.005 \le t \le 0.05$.

Certain elements are ubiquitous. For example, sodium, copper and chloride are detectable in certain very small proportions in virtually all inorganic materials. In the context of the present invention, proportions of less than 0.02 mole % of cations or anions are disregarded. Any mixed hydroxide obtained according to the inventive process which comprises less than 0.02 mole % of sodium is thus considered to be sodium-free in the context of the present invention.

The inventive process is carried out in a stirred tank reactor and includes carrying out the inventive process in a stirred tank reactor as batch reactor in a continuous stirred tank reactor or in a cascade of at least two continuous stirred tank reactors, for example in a cascade of 2 to 4 continuous stirred tank reactors. It is preferred to carry out the inventive process in a continuous stirred tank reactor. Continuous stirred tank reactors contain at least one overflow system that allows to continuously—or within intervals—withdraw slurry—or mother liquor—from said continuous stirred tank reactor.

In embodiments wherein the stirred vessel is a continuous stirred tank reactor or a cascade of at least two stirred tank reactors, the respective stirred tank reactor(s) have an overflow system. Slurry containing precipitated mixed metal hydroxide of TM and a mother liquor. In the context of the present invention, mother liquor comprises water-soluble salts and optionally further additives present in solution. Examples of possible water-soluble salts include alkali metal salts of the counterions of transition metal, for example sodium acetate, potassium acetate, sodium sulfate, potassium sulfate, sodium nitrate, potassium nitrate, sodium halide, potassium halide, including the corresponding ammonium salts, for example ammonium nitrate, ammonium sulfate and/or ammonium halide. Mother liquor most preferably comprises sodium sulfate and ammonium sulfate and ammonia.

In one embodiment of the present invention, the inventive process is performed in a vessel that is equipped with a clarifier. In a clarifier, mother liquor is separated from precipitated mixed metal hydroxide of TM and the mother liquor is withdrawn.

In step (a), various solutions are provided:

aqueous solution (α) containing water-soluble salts of Ni and of at least one metal selected from Co and Mn, and, optionally, at least one further metal selected from Ti, Zr, Mo, W, Al, Mg, Nb, and Ta, and in the range of from 0.01 to 0.05 mol-%, referring to TM, of α- or β-amino acid or its alkali metal salt, and an aqueous solution (β) containing an alkali metal hydroxide and, optionally, an aqueous solution (γ) containing ammonia. Preferably, the present invention is carried out without the use of a solution (γ).

In step (a), an aqueous solution containing water-soluble salts of Ni and of at least one metal selected from Co and Mn is provided, solution (α). The selection of salts reflects the composition of TM, and the molar content of nickel is at least 60%, referring to TM. If applicable, solution (α) contains at least one further metal selected from Ti, Zr, Mo, W, Al, Mg, Nb, and Ta, Solution (α) further contains in the range of from 0.01 to 0.05 mol-%, referring to TM, of α- or β-amino acid or its alkali metal salt. Examples of α-amino acids are cysteine, proline, asparagine, leucine, aspartic acid, lysine, phenylalanine, α-alanine—hereinafter also briefly referred to as alanine—valine, serine, and an example of β-amino acid is β-alanine. Examples of alkali metal salts are sodium and potassium salts. Partially neutralized α- or β-amino acid are possible as well. Preferred are for example the sodium salt of alanine, of glycine and of serine. Without wishing to be bound by any theory, we assume that such amino acid is forming a complex with any of TM, for example with nickel.

Even more preferably, α-amino acids are selected from glycine and its sodium- and potassium salts.

α-Alanine may be provided as L-alanine or racemic alanine or as partially racemized L-alanine. Serine may be provided as L-serine or racemic serine or partially racemized. Glycine is preferred as amino acid.

Said solution (α) may be manufactured by dissolving water-soluble salts of TM, for example the sulfates, in water and to then add amino acid selected from glycine, alanine and serine or their alkali metal salts in the above quantity. It possible as well to dissolve water-soluble salts of TM, for example the sulfates, in the presence of said α- or β-amino acid or its alkali metal salt in water. It is preferred, though, to form such solution (α) by combining an aqueous solution of said α- or β-amino acid or its alkali metal salt with an aqueous solution of water-soluble salt(s) of TM, for example immediately before combining the freshly formed solution (α) with solution (β) and, if applicable, solution (γ). Said formation may be carried out as premixing in a Y-nozzle.

The term water-soluble salts of nickel or of metals other than nickel refers to salts that exhibit a solubility in distilled water at 25° C. of 25 g/l or more, the amount of salt being determined under omission of crystal water and of water stemming from aquo complexes. Water-soluble salts of nickel and cobalt may preferably be the respective water-soluble salts of $Ni^{2+}$ and $Co^{2+}$. Examples of water-soluble salts of nickel and cobalt are the sulfates, the nitrates, the acetates and the halides, especially chlorides. Preferred are nitrates and sulfates, of which the sulfates are more preferred.

Solution (α) may have a pH value in the range of from 2 to 5. It is preferred to not add ammonia to solution (α).

In step (a), an aqueous solution of alkali metal hydroxide is provided, hereinafter also referred to as solution (β). An example of alkali metal hydroxides is lithium hydroxide, preferred is potassium hydroxide and a combination of sodium and potassium hydroxide, and even more preferred is sodium hydroxide.

Solution (β) may contain some amount of carbonate, e.g., 0.1 to 2% by weight, referring to the respective amount of alkali metal hydroxide, added deliberately or by aging of the solution or the respective alkali metal hydroxide.

Solution (β) may have a concentration of hydroxide in the range from 0.1 to 12 mol/l, preferably 6 to 10 mol/1.

The pH value of solution (β) is preferably 13 or higher, for example 14.5.

In one embodiment of the present invention, an aqueous solution (γ) is provided. Solution (γ) contains ammonia. Solution (γ) may have a pH value in the range of from 8 to 10 and an ammonia concentration in the range of from 1 to 25 mol/1.

In one embodiment of the present invention, aqueous solution (α) and aqueous solution (β) and, if applicable, aqueous solution (γ) have a temperature in the range of 10 to 75° C. before they are combined in said stirred tank reactor.

In step (b), aqueous solution (α) and aqueous solution (β) and, if applicable, aqueous solution (γ) are combined at a pH value in the range of from 10.0 to 13.0 in a stirred tank reactor, thereby creating solid particles of a hydroxide containing nickel, said solid particles being slurried.

In the course of step (b), aqueous solution (α) and aqueous solution (β) are fed into a reactor. Preferably, aqueous solution (α) and aqueous solution (β) are fed into the reactor in a way that the stoichiometry of the metals of TM on one hand and the hydroxide ions on the other hand are "correct", that means the stoichiometries match the stoichiometry of the respective hydroxide to be precipitated. In another embodiment of the present invention, the stoichiometries are adjusted in a way that an excess of hydroxide is present, for example 1 to 5 mol-% with respect to the hydroxide.

In one embodiment of the present invention, aqueous solutions (α) and (β) and—if applicable, (γ)—are fed into the stirred tank reactor through separate inlets. In one embodiment of the present invention, at least one of the inlets is located directly above the vortex caused by the stirring.

In one embodiment of the present invention, aqueous solutions (α) and (β) and—if applicable, (γ) are introduced into said stirred vessel through two inlets, e.g., two pipes whose outlets are located next to each other, for example in parallel, or through a Y-mixer.

In a preferred embodiment of the present invention, the at least two inlets are designed as a coaxial mixer that comprises two coaxially arranged pipes through aqueous solutions (α) and (β) are introduced into a stirred tank reactor. In one embodiment of the present invention, step (b) is carried out by using two or more coaxially arranged pipes through which aqueous solutions (α) and (β) and—if applicable, (γ) are introduced into said stirred tank reactor. In another embodiment of the present invention, the introduction step is carried out by using exactly one system of coaxially arranged pipes through which aqueous solutions (α) and (β) and—if applicable, (γ) are introduced into said stirred tank reactor.

In a preferred embodiment, aqueous solutions (α) and (β) are fed into the stirred tank reactor through a coaxial nozzle.

In embodiments wherein a cascade of at least 2 continuous stirred tank reactors are used aqueous solutions (α) and (β) and—if applicable, solution (γ)—are fed into the stirred tank reactor that is highest upstream.

The stirred tank reactor(s) used in the present invention comprise a stirrer. Such stirrer may be selected from pitch blade turbines, Rushton turbines, cross-arm stirrers, dissolver blades and propeller stirrers. Stirrers may be operated at rotation speeds that lead to an average energy input in the range from 0.1 to 10 W/l, preferably in the range from 1 to 7 W/l.

In addition, the stirred tank reactor(s) used in the present invention may comprise one or more baffles, for example one to four.

In one embodiment of the present invention, step (b) may be performed at a temperature in the range from 20 to 90° C., preferably 30 to 80° C. and more preferably 35 to 75° C. The temperature is determined in the stirred tank reactor.

In one embodiment of the present invention, step (b) has a duration in the range of from 10 minutes to 10 hours. In embodiments where the inventive process is carried out as continuous process the duration refers to the average residence time.

In one embodiment of the present invention, step (b) may be performed at ambient pressure. in other embodiments, step (b) is performed at slightly elevated pressure, for example at 10 to 100 mbar above ambient pressure.

Step (b) can be performed under air, under inert gas atmosphere, for example under noble gas or nitrogen atmosphere, or under reducing gas atmosphere. Examples of reducing gases include, for example, CO and $SO_2$. Preference is given to working under inert gas atmosphere.

In one embodiment of the present invention, the inventive process is performed in a stirred tank reactor that is equipped with a clarifier. In a clarifier, mother liquor is separated from precipitated hydroxide of TM and the mother liquor is withdrawn.

In one embodiment of the present invention, step (b) is performed in two sub-steps (b1) and (b2), and wherein sub-step (b1) is performed at a pH value that is by 0.2 to 2.0 units higher than in sub-step (b2). In other words, the pH value in sub-step (b2) is by 0.2 to 2.0 units lower than in sub-step (b1). The lowering of the pH value may be accomplished, e.g., by adding less ammonia in sub-step (b2) than in sub-step (b1), or by selecting an higher ratio of alkali metal hydroxide to TM in sub-step (b1) compared to sub-step (b2), or by addition of an acid, for example sulfuric acid. However, the pH value in sub-step (b2) is still at least 10.0. Preferably, the duration of step (b2) is longer than the duration of step (b1).

In one embodiment of the present invention, sub-steps (b1) and (b2) are performed in a way that the solids from sub-step (b1) are isolated and used as a solid seed for sub-step (b2). In other embodiments, sub-steps (b1) and (b2) are performed in a way that the slurry obtained from sub-step (b1) is used in situ for sub-step (b2).

In one embodiment of the present invention, sub-steps (b1) and (b2) are preformed in a way that α- or β-amino acid or its respective alkali metal salt is added in both sub-steps or at least in one sub-step, for example in sub-step (b2). The latter embodiment may be achieved by carrying out sub-step (b1) by combining a solution (α') containing water-soluble salts of TM but neither amino acid nor its respective alkali metal salt with a solution (β) and, optionally, a solution (γ), followed by combining in sub-step (b2) a solution (α) with a solution (β) and, optionally, a solution (γ).

In another embodiment of the present invention, step (b) is performed at a pH value that varies by 0.2 units at most. Thus, the pH value is essentially constant during step (b).

By performing the inventive process, an aqueous slurry is formed. The inventive process is very robust against undesired changes of the pH value. From said aqueous slurry, a particulate mixed hydroxide may be obtained by solid-liquid separation steps, for example filtering, spray-drying, drying under inert gas or air, or the like. If dried under air, a partial oxidation may take place, and a mixed (oxy)hydroxide of TM is obtained.

Precursors obtained according to the inventive process are excellent starting materials for cathode active materials which are suitable for producing batteries with a maximum volumetric energy density.

Another aspect of the present invention relates to precursors, hereinafter also referred to as inventive precursors. Inventive precursors are particulate (oxy)hydroxides of TM wherein TM comprises at least 70 mol-% nickel and wherein said (oxy)hydroxide has an average particle diameter (D50) in the range of from 2 to 20 μm wherein TM includes at least one metal selected from Co and Mn, and, optionally, at least one further metal selected from Ti, Zr, Mo, W, Al, Mg, Nb, and Ta, and wherein said (oxy)hydroxide contains in the range of from 500 to ppm to 1% by weight C as organic carbon, and wherein at least 60 vol.-% of the secondary particles consist of agglomerated primary particles that are essentially radially oriented.

To quantify the organic carbon, all carbon is typically converted into carbon dioxide by heat treatment under oxygen atmosphere and measuring the $CO_2$ by infrared spectroscopy.

The organic carbon is preferably glycine, alanine or serine or any of its alkali metal salts.

The portion of radially oriented primary particles may be determined, e.g., by SEM (Scanning Electron Microscopy) of a cross-section of at least 5 secondary particles.

"Essentially radially oriented" does not require a perfect radial orientation but includes that in an SEM analysis, a deviation G to a perfectly radial orientation is at most 5 degrees.

Furthermore, at least 60% of the secondary particle volume is filled with radially oriented primary particles. Preferably, only a minor inner part, for example at most 40%, preferably at most 20%, of the volume of those particles is filled with non-radially oriented primary particles, for example, in random orientation.

In one embodiment of the present invention, TM is a combination of metals according to general formula (I)

$$(Ni_aCo_bMn_c)_{1-d}M_d \quad (I)$$

with a being in the range of from 0.7 to 0.99, preferably from 0.83 to 0.92, b being zero or in the range of from 0.01 to 0.2, preferably from 0.03 to 0.15, c being in the range of from zero to 0.2, preferably from 0.03 to 0.15, d being in the range of from zero to 0.1, preferably from 0.003 to 0.03, M is at least one of Al, Mg, Ti, Mo, Nb, Ta, W and Zr, and b+c>zero, and a+b+c=1.

In one embodiment of the present invention, inventive precursor has a total pore/intrusion volume in the range of from 0.033 to 0.1 ml/g, preferably 0.035 to 0.07 ml/g in the pore size range from 20 to 600 Å, determined by $N_2$ adsorption, determined in accordance with DIN 66134 (1998), when the sample preparation for the $N_2$ adsorption measurement is done by degassing at 120° C. for 60 minutes.

Inventive precursors have an average secondary particle diameter D50 in the range of from 2 to 20 μm, preferably 3 to 16 μm and even more preferably 5 to 12 μm.

In one embodiment of the present invention, inventive precursors have a specific surface according to BET (hereinafter also "BET-Surface") in the range of from 2 to 70 $m^2/g$, preferably from 4 to 50 $m^2/g$. The BET surface may be determined by nitrogen adsorption after outgassing of the sample at 200° C. for 30 minutes or more and beyond this accordance with DIN ISO 9277:2010.

In one embodiment of the present invention, inventive precursors have a particle size distribution [(D90)−(D10)] divided by (D50) is in the range of from 0.35 to 2, preferably from 0.35 to 0.5 or from 0.8 to 1.4.

In one embodiment of the present invention, inventive precursors have a bimodal particle size distribution with the first maximum being in the range from 3 to 7 μm ("the smaller particle") and the second maximum in the range from 11 to 17 μm ("the bigger particles"). Even more preferably, the total volume of the smaller particles is in the range of from 10 to 25% of the total volume of the bigger particles.

In one embodiment of the present invention, the particles of inventive precursor display a structure of multiple concentric circles, for example of at least 10 and preferably up to 200 rings. Such concentric rings may be detected when a cross-section of such particles is analyzed by SEM. The structure may be compared to growth rings in trees, with each of the growth rings having a strength in the range of from 5 to 500 nm.

in one embodiment of the present invention, the particles of inventive precursors have a form factor in the range of from 0.87 to 0.99.

Inventive precursors are excellently suited for making cathode active materials with a high energy density. Such cathode active materials may be made by mixing inventive precursor with a source of lithium, e.g., $Li_2O$ or LiOH or $Li_2CO_3$, each water-free or as hydrates, and calcination, for example at a temperature in the range of from 600 to 1000° C. A further aspect of the present invention is thus the use of inventive precursors for the manufacture of cathode active materials for lithium ion batteries, and another aspect of the present invention is a process for the manufacture of cathode active material for lithium ion batteries—hereinafter also referred to as inventive calcination—wherein said process comprises the steps of mixing an inventive particulate transition metal (oxy)hydroxides with a source of lithium and thermally treating said mixture at a temperature in the range of from 600 to 1000° C. Preferably, the ratio of inventive precursor and source of lithium in such process is selected that the molar ratio of Li and TM is in the range of from 0.95:1 to 1.2:1, more preferably 0.98 to 1.05.

In one embodiment of the present invention, the inventive precursor is heated to a temperature in the range of from 600 to 1000° C.—and thus dehydrated or "pre-calcined"—prior to mixing with a source of lithium. In such embodiments, a pre-calcined particulate transition metal (oxy)hydroxide is mixed with a source of lithium and said mixture is thermally treating at a temperature in the range of from 600 to 1000° C. Preferably, the ratio of pre-calcined inventive precursor and source of lithium is selected that the molar ratio of Li and TM is in the range of from 0.95:1 to 1.2:1, more preferably 0.98 to 1.05.

Examples of inventive calcinations include heat treatment at a temperature in the range of from 600 to 900° C., preferably 650 to 850° C. The terms "treating thermally" and "heat treatment" are used interchangeably in the context of the present invention.

In one embodiment of the present invention, the mixture obtained for the inventive calcination is heated to 600 to 900° C. with a heating rate of 0.1 to 10° C./min.

In one embodiment of the present invention, the temperature is ramped up before reaching the desired temperature of from 600 to 900° C., preferably 650 to 800° C. For example, first the mixture obtained from step (d) is heated to a temperature to 350 to 550° C. and then held constant for a time of 10 min to 4 hours, and then it is raised to 650° C. up to 800° C. and then held at 650 to 800 for 10 minutes to 10 hours.

In one embodiment of the present invention, the inventive calcination is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, the inventive calcination is performed in an oxygen-containing atmosphere, for example in a nitrogen-air mixture, in a rare gas-oxygen mixture, in air, in oxygen or in oxygen-enriched air. In a preferred embodiment, the atmosphere in step (d) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, the inventive calcination is performed under a stream of gas, for example air, oxygen and oxygen-enriched air. Such stream of gas may be termed a forced gas flow. Such stream of gas may have a specific flow rate in the range of from 0.5 to 15 $m^3$/h-kg material according to general formula $Li_{1+x}TM_{1-x}O_2$. The volume is determined under normal conditions: 298 Kelvin and 1 atmosphere. Said stream of gas is useful for removal of gaseous cleavage products such as water and carbon dioxide.

In one embodiment of the present invention, the inventive calcination has a duration in the range of from one hour to 30 hours. Preferred are 10 to 24 hours. The time at a temperature above 600° C. is counted, heating and holding but the cooling time is neglected in this context.

A further aspect of the present invention refers to cathodes comprising at least one particulate electrode active material according to the present invention. They are particularly useful for lithium ion batteries. Lithium ion batteries comprising at least one cathode according to the present invention exhibit a good cycling behavior/stability. Electrodes comprising at least one particulate cathode active material according to the present invention are hereinafter also referred to as inventive cathodes or cathodes according to the present invention.

Specifically, inventive cathodes contain (1) at least one inventive particulate electrode active material,
(2) carbon in electrically conductive form,
(3) a binder material, also referred to as binders or as binders (3), and, preferably,
(4) a current collector.

In a preferred embodiment, inventive cathodes contain (1) 80 to 98% by weight inventive particulate electrode active material,
(2) 1 to 17% by weight of carbon,
(3) 1 to 15% by weight of binder, percentages referring to the sum of (1), (2) and (3).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (2). Carbon (2) can be selected from soot, active carbon, carbon nanotubes, graphene, and graphite, and from combinations of at least two of the foregoing.

Suitable binders (3) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (3) is polybutadiene.

Other suitable binders (3) are selected from polyethylene oxide (PEO), cellulose, carboxymethylcellulose, polyimides and polyvinyl alcohol.

In one embodiment of the present invention, binder (3) is selected from those (co)polymers which have an average molecular weight $M_w$ in the range from 50,000 to 1,000,000 g/mol, preferably to 500,000 g/mol.

Binder (3) may be cross-linked or non-cross-linked (co) polymers.

In a particularly preferred embodiment of the present invention, binder (3) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (3) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to inventive cathode active material. In other embodiments, inventive cathodes may comprise 0.1 up to less than 1% by weight of binder(s).

Further disclosed is a battery, containing at least one cathode comprising inventive cathode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

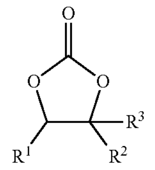

(II)

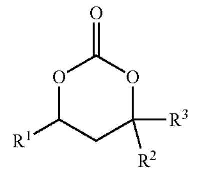

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

Preferably, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

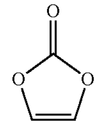

(IV)

The solvent or solvents is/are preferably used in the water-free state, i.e. with a water content in the range from 1 ppm to 0.1% by weight, which can be determined, for example, by Karl-Fischer titration.

Electrolytes further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among LiC$(CF_3SO_2)_3$, $LiN(CF_3SO_2)_2$, $LiPF_6$, $LiBF_4$, $LiClO_4$, with particular preference being given to $LiPF_6$ and LiN$(CF_3SO_2)_2$.

Batteries disclosed in the context of the present invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Such batteries further comprise a housing which can have any shape, for example cuboidal or the shape of a cylindrical disk or a cylindrical can. In one variant, a metal foil configured as a pouch is used as housing.

Batteries as disclosed hereunder display a good cycling stability and a low capacity fading.

Batteries as disclosed hereunder can comprise two or more electrochemical cells that are combined with one another, for example they can be connected in series or connected in parallel.

Connection in series is preferred. In such batteries, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further discloses the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

Brief description of the drawing, FIG. 1:

A: Stirred vessel

B: Stirrer

C: Feed of solution (β)

D: Feed of solution (γ)

E: Feed of solution (α)

F: Baffles

G: Engine for stirrers

WORKING EXAMPLES

General

Powder X-ray diffraction (XRD) data was collected using a laboratory diffractometer (D8 Discover, Bruker AXS GmbH, Karlsruhe). The instrument was set up with a Molybdenum X-ray tube. The characteristic K-alpha radiation was monochromatized using a bent Germanium Johansson type primary monochromator. Data was collected in the Bragg-Brentano reflection geometry in a 2θ range from 5.0 to 50°, applying a step size of 0.019°. A LYNXEYE area detector was utilized to collect the scattered X-ray signal.

For XRD measurements, the precursors were ground using an IKA Tube Mill and an MT40.100 disposable grinding chamber. The powder was placed in a sample holder and flattened using a glass plate.

Rietveld refinement analyses of the microstructures of the precursor materials were performed using DIFFRAC.TOPAS V6 software (BrukerAXS GmbH) giving access to the corresponding crystallite size. Instrumental broadening was considered during the peak fitting, leading to a separation of the instrumental from the sample broadening. The sample contribution is determined by using a single Lorentzian profile function that is defined by the following equation:

$$\beta = \frac{\lambda}{L\cos\theta}$$

The determination of the share of and extent to which primary particles are oriented radially was performed on the basis of cross-sectional SEM images of the respective precursor.

FIG. 2 is a diagram illustrating the radial direction of primary particles. Brief description of FIG. 2:

The variables in FIG. 2 have the following meaning:

A: Secondary particle

B: Primary particle

C: Center of secondary particle

D: Center of primary particle

E: Radial direction, defined as the direction from secondary particle center to primary particle center F: Primary particle orientation, defined as the orientation of the eigenvector with the largest eigenvalue of the covariance matrix calculated for the binary mask of the primary particle G: Angle between primary particle orientation and ideal radial direction For each primary particle, the minimum absolute angle (G) between the radial direction (E) and the direction of the primary particle major axis (F) is determined. Therefore, an angle of 0 means the primary particle is oriented towards ideal radial direction, and the larger the angle, the less ideally radially orientated. The distribution of angles G over the primary particles quantifies the extent to which the sample as a whole is radially oriented. For perfect radial orientation, the distribution will be located at zero, while for a perfect random orientation the angles will be distributed uniformly between 0 and 90 degrees with median and mean angles of 45 degrees.

To determine form factor and axis ratio of samples, both properties were first determined for at least 50 individual particles of each sample and then averaged.

The form factor of the individual particles was calculated from the perimeter and area determined from top view SEM images:

$$\text{Form factor} = (4\pi\cdot\text{area})/(\text{perimeter})^2$$

While, a perfect sphere would possess a form factor of 1.0, any deviation from perfect sphericity lead to form factors <1.0

To determine the axis ratio of the bounding box of a single particle, the smallest possible, rectangular bounding box is set around the top view SEM image of a particle. The axis ratio is calculated from the length of the two sides $a_1$ and $a_2$ (with $a_1 \geq a_2$) by: axis ratio of the bounding box=$a_1/a_2$.

While, a perfect sphere would possess an axis ratio of the bounding box of 1.0, all deviations from perfect sphericity lead to an axis ratio >1.0.

To quantify the amount of (organic) carbon, 100 mg of material were filled into a single-use ceramic cup. Around 0.5 g of iron granulate were added to the sample and the mixture was covered with a layer of around 1.5 g of tungsten granulate. The sample was heated in a flow of pure oxygen in the induction furnace of an Eltra CS 800 analyzer and the carbon of the sample was converted into carbon dioxide, which was quantified in the combustion gases by infrared spectrometry.

To quantify the stability of the corresponding precipitation process, the stability factor stab was determined as the maximum change in d50 by increasing the process pH by 0.2 pH units.

Glycine had a purity >99% and was purchased from Sigma Aldrich Water: deionized unless specifically mentioned otherwise I. Manufacture of the Inventive Precursors and of Comparative Precursors I.1 Manufacture of Comparative Precursors C-TM-OH.1, C-TM-OH.4 and the Inventive Precursors TM-OH.2, TM-OH.3, TM-OH.5 and the Seed Slurry Fraction s.1:

All experiments were carried out in a 2.4 L stirred tank reactor ("Reactor 1") equipped with baffles and a cross-arm stirrer, see FIG. 1.

The feed tube for solution (α) was separated from both other tubes by 8 cm each, while the tube for solution (γ) was separated by 2.5 cm from the tube for solution (β). All tubes had an outer diameter of 6 mm, an inner diameter of 2 mm and they were mounted in a way that the corresponding outlet was approximately 5 cm below the liquid level. In the context of said working examples this vessel is also referred to as "vessel 1". Vessel 1 had a constant nitrogen overflow during all reactions.

At the beginning of each experimental example, Reactor 1 was charged with 2 l of water. The temperature was set to 55° C. The stirrer element was activated and constantly operated at 1000 rpm (revolutions per minute, average energy input~4.5 W/l).

I.1.1 Manufacture of Comparative Precursor C-TM-OH.1:

Solution C-(α.1): $NiSO_4$, $CoSO_4$ and $MnSO_4$ (TM.1, molar ratio 83:12:05, total transition metal concentration: 1.65 mol/kg) in water Solution (β.1) 25 wt % NaOH in water Solution (γ.1) of 25 wt % ammonia in water Solutions C-(α.1), (β.1) and γ.1) were simultaneously introduced into Reactor 1. The molar ratio of ammonia and TM.1 was adjusted to 0.25. The sum of volume flows was set to adjust an average residence time of 5 hours. The flow rate of solution (β.1) was adjusted by a pH regulation circuit to keep the pH value in the stirred vessel at a constant value of 11.9. Reactor 1 was operated continuously keeping the liquid level in the vessel constant. A hydroxide of TM.1 was collected via free overflow from the vessel. The resulting slurry contained about 120 g/l hydroxide of TM.1. The slurry was washed with water and an aqueous solution of sodium hydroxide (1 kg of 25 wt % aqueous sodium hydroxide solution per kg of precursor), filtered and dried at 120° C. over 14 hours. The comparative precursor C-TM-OH.1 was obtained.

I.1.2 Manufacture of Inventive Precursor TM-OH.2:

Solution (α.2): $NiSO_4$, $CoSO_4$ and $MnSO_4$ (TM.2, molar ratio 83:12:05, total transition metal concentration: 1.65 mol/kg) in water, and glycine, molar ratio of glycine to TM.2: 0.01

Solution (β.2) 25 wt % NaOH in water

Solution (γ.2) of 25 wt % ammonia in water

Solutions (α.2), (β.2) and γ.2) were simultaneously introduced into Reactor 1. The molar ratio of ammonia and TM.2 was adjusted to 0.15. The sum of volume flows was set to adjust an average residence time of 5 hours. The flow rate of solution (β.2) was adjusted by a pH regulation circuit to keep the pH value in the stirred vessel at a constant value of 11.9. Reactor 1 was operated continuously keeping the liquid level in the vessel constant. A hydroxide of TM.2 was collected via free overflow from the vessel. The resulting slurry contained about 120 g/l hydroxide TM.2. The slurry was washed with water and an aqueous solution of sodium hydroxide (1 kg of 25 wt % aqueous sodium hydroxide solution per kg of solid hydroxide), filtered and dried at 120° C. over 14 hours. Inventive precursor TM-OH.2 was obtained.

I.1.3 Manufacture of Inventive Precursor TM-OH.3:

Solution (α.3): $NiSO_4$, $CoSO_4$ and $MnSO_4$ (TM.3, molar ratio 83:12:05, total transition metal concentration: 1.65 mol/kg) in water, and glycine, molar ratio of glycine to TM.3: 0.03

Solution (β.3) 25 wt % NaOH in water

Solution (γ.3) of 25 wt % ammonia in water

Solutions (α.3), (β.3) and γ.3) were simultaneously introduced into Reactor 1. The molar ratio of ammonia and ZM.3 was adjusted to 0.15. The sum of volume flows was set to adjust an average residence time of 5 hours. The flow rate of solution (β.3) was adjusted by a pH regulation circuit to keep the pH value in the stirred vessel at a constant value of 11.4. Reactor 1 was operated continuously keeping the liquid level in the vessel constant. A mixed hydroxide TM.3 was collected via free overflow from the vessel. The resulting slurry contained about 120 g/l mixed hydroxide of TM.3. The slurry was washed with water and an aqueous solution of sodium hydroxide (1 kg of 25 wt % aqueous sodium hydroxide solution per kg of solid hydroxide), filtered and dried at 120° C. over 14 hours. Inventive precursor TM-OH.3 was obtained.

SEM images of C-TM-OH.1, TM.OH.2 and TM.OH.3 are shown in FIG. 3 and FIG. 4.

TABLE 1

Overview over properties of -TM-OH.1, TM.OH.2 and TM.OH.3

| precursor | stab | D50 [μm] | span | BET surface [$m^2/g$] | C content [wt %] | Form factor | Axis ratio BB | G [°] | crystallite size [nm] |
|---|---|---|---|---|---|---|---|---|---|
| C-TM-OH.1 | 2.8 | 12.5 | 1.3 | 25 | 0.11 | 0.82 | 1.33 | 11 | 87 |
| TM-OH.2 | 0.2 | 11.6 | 1.3 | 52 | 0.23 | 0.89 | 1.31 | — | 83 |
| TM-OH.3 | 0.3 | 9.0 | 1.2 | 55 | 0.30 | 0.93 | 1.15 | 2 | 102 |

The organic carbon content corresponds, e.g., to the difference of C content of TM-OH.2 and C-TM-OH.1.

The primary particle orientation was quantified by the angle G between the primary particle orientation and the ideal radial direction, compare above.

I.1.4 Manufacture of Pre-Calcined Inventive Precursor TMO.3:

TM-OH.3 was poured into an aluminum crucible and heated to 400° C. for 60 min applying a heating rate of 1 K/min under oxygen atmosphere. TMO.3 was obtained. The amount of organic carbon in d-TM.OH.3 was determined to be 0.08 wt % compared to 0.30% in TM-OH.3.

I.1.5 Manufacture of Comparative Precursor C-TM-OH.4:

Solution C-(α.4): $NiSO_4$ $MnSO_4$ (TM.4, molar ratio 95:05, total transition metal concentration: 1.65 mol/kg) in water Solution (β.4) 25 wt % NaOH in water Solution (γ.4) of 25 wt % ammonia in water Solutions C-(α.4), (β.4) and γ.4) were simultaneously introduced into Reactor 1. The molar ratio of ammonia and TM.4 was adjusted to 0.25. The sum of volume flows was set to adjust an average residence time of 5 hours. The flow rate of solution (B3.4) was adjusted by a pH regulation circuit to keep the pH value in the stirred vessel at a constant value of 11.3. Reactor 1 was operated continuously keeping the liquid level in the vessel constant. A mixed hydroxide of TM.4 was collected via free overflow from the vessel. The resulting slurry contained about 120 g/l mixed hydroxide of TM.4. The slurry was washed with water and an aqueous solution of sodium hydroxide (1 kg of 25 wt % aqueous sodium hydroxide solution per kg of precursor), filtered and dried at 120° C. over 14 hours. The comparative precursor C-TM-OH.4 was obtained.

I.1.6 Manufacture of Inventive Precursor TM-OH.5:

Solution (α.5): $NiSO_4$ and $MnSO_4$ (TM.5, molar ratio 95:05, total transition metal concentration: 1.65 mol/kg) in water, and glycine, molar ratio of glycine to TM.5: 0.01

Solution (β.5) 25 wt % NaOH in water

Solution (γ.5) of 25 wt % ammonia in water

Solutions (α.5), (β.5) and γ.5) were simultaneously introduced into Reactor 1. The molar ratio of ammonia and TM.5 was adjusted to 0.15. The sum of volume flows was set to adjust an average residence time of 5 hours. The flow rate of solution (β.5) was adjusted by a pH regulation circuit to keep the pH value in the stirred vessel at a constant value of 10.3. Reactor 1 was operated continuously keeping the liquid level in the vessel constant. A hydroxide of TM.5 was collected via free overflow from the vessel. The resulting slurry contained about 120 g/l hydroxide TM.5. The slurry was washed with water and an aqueous solution of sodium hydroxide (1 kg of 25 wt % aqueous sodium hydroxide solution per kg of solid hydroxide), filtered and dried at 120° C. over 14 hours. Inventive precursor TM-OH.5 was obtained.

While severe changes of pH value were observed during manufacture of C-TM.OH.4, all accompanied with unwanted changes of the particle size distribution, precipitation of TM-OH.5 showed a stable process with constant pH value and particle size distribution over the entire reaction time.

SEM images of C-TM-OH.4 and TM.OH.5 are shown in FIG. 5.

TABLE 2

Overview of properties of C-TM-OH.4 and TM.OH.5

| precursor | stab | D50 [μm] | span | BET surface [$m^2$/g] | C content [wt %] | Form factor | Axis ratio BB |
|---|---|---|---|---|---|---|---|
| C-TM-OH.4 | 3.2 | 11.3 | 1.3 | 30 | n.d. | 0.78 | 1.26 |
| TM-OH.5 | 0.1 | 10.7 | 1.3 | 36 | n.d. | 0.87 | 1.20 |

n.d.: not determined

I.1.7 Manufacture of Seed Slurry Fraction $s_1$:

Solution C-(α.6): $NiSO_4$, $CoSO_4$ and $MnSO_4$ (TM.6, molar ratio 87:05:08, total transition metal concentration: 1.65 mol/kg) in water Solution (β.6) 25 wt % NaOH in water Solution (γ.6) of 25 wt % ammonia in water Step (b1.6)

Solutions C-(α.6), (β.6) and γ.6) were simultaneously introduced into Reactor 1. The molar ratio of ammonia and TM.6 was adjusted to 0.2. The sum of volume flows was set to adjust an average residence time of 5 hours. The flow rate of solution (β.6) was adjusted by a pH regulation circuit to keep the pH value in the stirred vessel at a constant value of 12.15. Reactor 1 was operated continuously keeping the liquid level in the vessel constant. After having operated Reactor 1 for a time of 15 hours, the particle size distribution did not change any more. Subsequently, the collection vessel was emptied, and the seed slurry fraction s, was collected for 5 hours each. The seed slurry fraction $s_1$ had a solids content of 120 g/l and was characterized by a d50 of 4.1 μm and a span of (d90-d10)/d50=1.69.

I.2 Manufacture of Comparative Precursor C-TM-OH.6 and Inventive Precursor TM-OH.7, Steps C-(b2.6) and (b2.7)

The following reactions were carried out in Reactor 2, similar to Reactor 1, but with a volume of 3.2 liter.

I.2.1 Manufacture of Comparative Precursors C-TM-OH.6:

Reactor 2 was charged with 1.6 l water containing 61 g ammonium sulfate and heated to 55° C. under nitrogen atmosphere. Solution (β.6) was added until the pH value was 12.05. The stirrer was set to 1000 rpm, and 320 ml of slurry s, were added. Reactor 2 was continuously fed with solution C-(α.6), (β.6) and (γ.6) in a way that the pH value of the mother liquor was 12.05 and the molar ratio of $NH_3$ to the TM.6 was 0.55. Mother liquor was separated from the solid and removed from the reactor by a clarifier attached to the top of the reactor. The individual flow rates of the solutions were adjusted to an average residence time of 5 hours. The stirrer speed was kept constant. The particles were grown until they reached a particle size of around 13 to 14 μm and subsequently filtered, washed with water, dried and sieved, mesh size of 30 μm. Comparative precursor C-TM-OH.6 was obtained.

I.2.2 Manufacture of Inventive Precursors TM-OH.7

Solution (α.7): $NiSO_4$, $CoSO_4$ and $MnSO_4$ (TM.7, molar ratio 87:05:08, total transition metal concentration: 1.65 mol/kg) in water, and glycine, molar ratio of glycine to TM.3: 0.03

Solution (β.7) 25 wt % NaOH in water

Solution (γ.7) of 25 wt % ammonia in water

Reactor 2 was charged with 1.6 l water containing 61 g ammonium sulfate and heated to 55° C. under nitrogen atmosphere. Solution (β.6) was added until the pH value was 12.05. The stirrer was set to 1000 rpm, and 320 ml of slurry s, were added. Reactor 2 was continuously fed with solution (α.7), (β.7) and (γ.7) in a way that the pH value of the mother liquor was 12.05 and the molar ratio of $NH_3$ to TM.7 was 0.55. Mother liquor was separated from the solid and removed from the reactor by a clarifier attached to the top of the reactor. The individual flow rates of the solutions were adjusted to an average residence time of 5 hours. The stirrer speed was kept constant. The particles were grown until they reached a particle size of around 13 to 14 μm and subsequently filtered, dried and sieved, mesh size of 30 μm. Inventive precursor TM-OH.7 was obtained.

II. Manufacture of Cathode Active Materials, and Electrode Manufacture

II.1 Manufacture of the Comparative Cathode Active Material C-CAM.1 and the Inventive Cathode Active Materials CAM.2 and CAM.3:

The respective precursor was is thermally treated at about 300° C. The respective pre-calcined material was mixed with $LiOH·H_2O$, $Al_2O_3$ and $Zr(OH)_4$ in molar ratio of Li:(Ni+Co+Mn) of 1.05:1, Al:(Ni+Co+Mn) of 0.02:1, ZrLi:(Ni+Co+Mn) of 0.0025:1, poured into a alumina crucible and heated at 750° C. for 6 hours under oxygen atmosphere (10 exchanges/h), heating rate of 3° C./min. The resultant cathode active material was cooled to ambient temperature at a cooling rate of 10° C./min and subsequently sieved using a mesh size of 30 μm to obtain the comparative cathode active material C-CAM.1 from precursor C-TM-OH.1 and the inventive cathode active materials CAM.2 from the precursor TM-OH.2 and CAM.3 from the precursor d-TM.OH.3.

II.2 Manufacture of the Comparative Cathode Active Material C-CAM.4 and the Inventive Cathode Active Material CAM.5:

The respective precursor was mixed with $LiOH·H_2O$ in molar ratio of Li:(Ni+Co+Mn) of 1.05:1, poured into an alumina crucible and heated at 750° C. for 6 hours under oxygen atmosphere (10 exchanges/h), heating rate of 3° C./min. The resultant cathode active material was cooled to ambient temperature at a cooling rate of 10° C./min and subsequently sieved using a mesh size of 30 μm to obtain the comparative cathode active material C-CAM.4 from precursor C-TMOH.4 and the inventive cathode active materials CAM.5 from the precursor TM-OH.5.

II.3 Manufacture of the Comparative Cathode Active Material C-CAM.6 and the Inventive Cathode Active Material CAM.7:

The respective precursor was mixed with $LiOH·H_2O$, $Al_2O_3$ and $Zr(OH)_4$ in molar ratio of Li:(Ni+Co+Mn) of 1.05:1, Al:(Ni+Co+Mn) of 0.02:1, ZrLi:(Ni+Co+Mn) of 0.003:1, poured into an alumina crucible and heated at 760° C. for 6 hours under oxygen atmosphere (10 exchanges/h), heating rate of 1.3° C./min. The resultant material was cooled to ambient temperature at a cooling rate of 10° C./min and subsequently sieved using a mesh size of 30 μm to obtain the comparative cathode active material C-CAM.6 from precursor C-TM-OH.6 and the inventive cathode active materials CAM.7 from the precursor TM-OH.7.

II.4 Manufacture of Electrodes and Testing

Electrode Manufacture and Half-Cell Electrochemical Measurements:

Electrodes contained 94% of the respective inventive or comparative cathode active material, 3% carbon black (Super C65) and 3% binder (polyvinylidene fluoride, Solef 5130). Slurries were mixed in N-methyl-2-pyrrolidone and cast onto aluminum foil by doctor blade. After drying of the electrodes for 6 h at 105° C. in vacuo, circular electrodes were punched, weighed and dried at 120° C. under vacuum for 12 hours before entering in an Ar filled glove box.

Coin-type electrochemical cells were assembled in an argon-filled glovebox. The positive 14 mm diameter (loading 8.0±0.5 mg $cm^{-2}$) electrode was separated from the 0.58 mm thick Li foil by a glass fiber separator (Whatman GF/D). An amount of 95 μl of 1 M LiPF6 in ethylene carbonate (EC): ethylmethyl carbonate (EMC), 3:7 by weight, was used as the electrolyte. Cells were galvanostatically cycled at a Maccor 4000 battery cycler between 3.1 and 4.3 V at room temperature by applying the following C-rates:

TABLE 4

Electrochemical test procedure of the coin half cells.

| | Charge | Discharge |
|---|---|---|
| Cycle 1 | 0.1 C | 0.1 C |
| Cycle 2-6 | 0.2 C + CV* | 0.2 C |
| Cycle 7 & 8 | 0.5 C + CV* | 0.5 C |
| Cycle 9 & 10 | 0.5 C + CV* | 2.0 C |
| Cycle 11 & 12 | 0.5 C + CV* | 3.0 C |
| Cycle 13 & 14 | 0.5 C + CV* | 0.5 C |
| Cycle 15 | Resistance measurement | |
| Cycle 16-40 | 0.5 C + CV* | 1.0 C |
| Cycle 41 + 42 | 0.5 C + CV* | 0.5 C |
| Cycle 43 | Resistance measurement | |
| Cycle 44-68 | 0.5 C + CV* | 1.0 C |

After charging at the listed C-rates, all charging steps except the first were finished by a constant voltage step (CV*) for 1 hour, or until the current reached 0.02 C.

During the resistance measurement (conducted every 25 cycles at 25° C.), the cell was charged at 0.2 C to reach 50% state of charge, relative to the previous discharge capacity. To equilibrate the cell, a 30 min open circuit step followed. Finally, a 2.5 C discharge current was applied for 30 s to measure the resistance. At the end of the current pulse, the cell was again equilibrated for 30 min in open circuit and further discharged at 0.2 C to 3.0 V.

TABLE 5

Discharge capacity (DC) and coulombic efficiency (CE) of the comparative cathode active material C-CAM.6 and inventive cathode active materials CAM.7.

| CAM | DC $1^{st}$ cycle [mA · h/g] | CE $1^{st}$ cycle | DC $5^{th}$ cycle [mA · h/g] | DC $25^{th}$ cycle [mA · h/g] | DC $50^{th}$ cycle [mA · h/g] |
|---|---|---|---|---|---|
| C-CAM.6 | 205 | 87.5 | 202 | 185 | 177 |
| CAM.7 | 210 | 89.1 | 206 | 188 | 182 |

The invention claimed is:

1. A process for making a particulate (oxy)hydroxide of TM, wherein TM are metals and TM comprises at least 60 mol-% nickel, and wherein said process comprises the steps of:

(a) providing an aqueous solution (α) comprising water-soluble salts of Ni and of at least one metal selected from the group consisting of Co and Mn, and, optionally, at least one further metal selected from the group consisting of Ti, Zr, Mo, W, Al, Mg, Nb, and Ta, and in a range of from 0.01 to 0.05 mol-% of α- or β-amino acid of TM or the alkali metal salt of TM, and an aqueous solution (β) comprising an alkali metal hydroxide and, optionally, an aqueous solution (γ) comprising ammonia, (b) combining the solution (α) and the solution (β) and, if applicable, the solution (γ) at a pH value in a range of from 10.0 to 13.0 in a stirred tank reactor, thereby creating solid particles of a hydroxide comprising nickel, said solid particles being slurried.

2. The process according to claim 1, wherein TM is a combination of metals according to general formula (I)

$$(Ni_aCo_bMn_c)_{1-d}M_d \quad (I)$$

wherein a is in a range of from 0.7 to 0.99, b is zero or in a range of from 0.01 to 0.2, c is in a range of from zero to 0.2, and d is in a range of from zero to 0.1, M is at least one of Al, Mg, Ti, Mo, Nb, Ta, W and Zr, and b+c>zero, and a+b+c=1.

3. The process according to claim 1, wherein said α-amino acid is selected from the group consisting of glycine, the sodium of glycine, and potassium salts.

4. The process according to claim 1, wherein the aqueous solutions (α) and (β) are fed into the stirred tank reactor through a coaxial nozzle.

5. The process according to claim 1, wherein step (b) is performed in two sub-steps (b1) and (b2), and wherein sub-step (b1) is performed at a pH value that is 0.2 to 2.0 units higher than sub-step (b2).

6. The process according to claim 1, wherein step (b) is performed at a pH value that varies by 0.2 units at most.

7. A particulate (oxy)hydroxide of TM, wherein TM comprises at least 70 mol-% nickel, wherein said (oxy) hydroxide has an average secondary particle diameter (D50) in a range of from 2 to 20 μm, wherein TM includes at least one metal selected from the group consisting of Co and Mn, and, optionally, at least one further metal selected from the group consisting of Ti, Zr, Mo, W, Al, Mg, Nb, and Ta, wherein said (oxy)hydroxide comprises in a range of from 0.05% to 1% by weight C as organic carbon, and wherein at least 60 vol.-% of the secondary particles comprise agglomerated primary particles that are perfectly radially oriented primary articles and primary particles whose deviation to a perfectly radial orientation is at most 5 degrees.

8. The particulate (oxy)hydroxide according to claim 7, wherein particles of the particulate (oxy)hydroxide display multiple concentric rings, detectable by scanning electron microscopy of a cross-section of such particles.

9. The particulate (oxy)hydroxide according to claim 7, wherein TM is a combination of metals according to general formula (I)

$$(Ni_aCo_bMn_c)_{1-d}M_d \quad (I)$$

wherein a is in a range of from 0.7 to 0.99, b is zero or in a range of from 0.01 to 0.2, c is in a range of from zero to 0.2, and d is in a range of from zero to 0.1, M is at least one of Al, Mg, Ti, Mo, Nb, Ta, W and Zr, and a+b+c=1.

10. The particulate (oxy)hydroxide according to claim 7, wherein the particulate (oxy)hydroxide has a bimodal particle size distribution with a first maximum being in a range from 3 to 7 μm and a second maximum in a range from 11 to 17 μm.

11. The particulate (oxy)hydroxide according to claim 7, wherein the particulate (oxy)hydroxide has a form factor in a range of from 0.87 to 0.99.

12. A method of using the particulate (oxy)hydroxide according to claim 7, the method comprising using the particulate (oxy)hydroxide for manufacture of cathode active materials for lithium ion batteries.

13. A process for manufacture of an electrode active material for lithium ion batteries, wherein said process comprises the steps of mixing the particulate (oxy)hydroxide according to claim 7 with a source of lithium and thermally treating said mixture at a temperature in a range of from 600 to 1000° C.

14. A cathode comprising (1) at least one electrode active material according to claim 7, (2) carbon in electrically conductive form, and (3) a binder material.

15. The cathode according to claim 14, wherein the cathode comprises (1) 80 to 98% by weight cathode active material, (2) 1 to 17% by weight of carbon, and (3) 1 to 15% by weight of binder material, wherein the percentages refer to a sum of (1), (2) and (3).

16. A process for manufacture of an electrode active material for lithium ion batteries, wherein said process comprises the steps of mixing a pre-calcined particulate (oxy)hydroxide according to claim 7 with a source of lithium and thermally treating said mixture at a temperature in a range of from 600 to 1000° C.

* * * * *